(12) United States Patent
Butler et al.

(10) Patent No.: US 8,045,852 B2
(45) Date of Patent: Oct. 25, 2011

(54) CHANNEL BALANCING ALGORITHM

(75) Inventors: David Butler, Richardson, TX (US);
Carlton Brown, Richardson, TX (US)

(73) Assignee: Alcatel Lucent, Paris (FR)

( * ) Notice: Subject to any disclaimer, the term of this patent is extended or adjusted under 35 U.S.C. 154(b) by 808 days.

(21) Appl. No.: 12/107,836

(22) Filed: Apr. 23, 2008

(65) Prior Publication Data
US 2009/0269055 A1    Oct. 29, 2009

(51) Int. Cl.
*H04B 10/08*    (2006.01)
(52) U.S. Cl. ............... 398/27; 398/79; 398/38; 398/34; 398/197; 398/196
(58) Field of Classification Search .............. 398/79, 398/140, 141, 158, 159, 160, 33, 38, 25, 398/26, 27, 15, 17, 34, 37, 94, 93, 162, 192, 398/193, 194, 195, 196, 197, 202, 208, 209, 398/58, 200, 201, 214
See application file for complete search history.

(56) References Cited

U.S. PATENT DOCUMENTS

| | | | | |
|---|---|---|---|---|
| 6,040,933 A | * | 3/2000 | Khaleghi et al. | 398/1 |
| 6,219,162 B1 | * | 4/2001 | Barnard et al. | 398/9 |
| 6,701,089 B1 | * | 3/2004 | Goodwin et al. | 398/79 |

* cited by examiner

*Primary Examiner* — Hanh Phan
(74) *Attorney, Agent, or Firm* — Garlick, Harrison & Markison (57) ABSTRACT

An algorithm is disclosed for performing channel balancing on channels between optical network elements within an optic-fiber communications system. The algorithm groups at least a portion of the channels into channel pairs, differentially adjusts the transmitter output power level of each of the channel pairs until the bit error ratio (BER) of at least one channel in each of the channel pairs exceeds a threshold, and records a respective power margin for each of the channels as the difference between the initial and final power levels. From the recorded power margins, a mean power margin is determined that is used to shift the transmitter output power level of each of the channels.

21 Claims, 5 Drawing Sheets

CHANNEL BALANCING ALGORITHM

BACKGROUND OF THE INVENTION

1. Technical Field of the Invention

The present invention relates in general to communication systems, and in particular, to wavelength division multiplexing (WDM) fiber-optic communication systems.

2. Description of Related Art

In fiber-optic communication systems, wavelength-division multiplexing is commonly used to multiplex multiple optical carrier signals (channels) onto a single optical fiber by using different wavelengths (colors) of laser light to carry different signals. This enables networks to not only add capacity, but also to provide bidirectional communication independent of traffic protocol or speed over one strand of fiber. In long haul WDM systems where the optical link is greater than 50-100 km, optical amplifiers are typically used to overcome fiber span losses. Optical amplifiers can be operated in either a constant-gain mode or a constant-power mode. In constant-power mode, the amplified output power is regulated to a fixed value, largely independent of the input signal power.

As the WDM channels propagate through the system, the gain and amplified spontaneous emission (ASE) noise applied to each of the constituent WDM channels varies slightly. While this variation is generally relatively small for signals passing through a single amplifier or fiber section, the effect becomes significant for a cascaded series of amplifiers typically found in WDM networks. Without some form of compensation, the cumulative effect produces an output spectrum with widely varying optical signal-to-noise ratio (OSNR) and power levels associated with each of the constituent WDM signals. Consequently, some WDM channels will reach the far end of the network with relatively poor operating margins, while others will arrive with significantly more margin than necessary.

Therefore, in many WDM systems, channel balancing is performed to adjust the relative input power levels (transmitter output power levels) of the constituent WDM channels until all of the associated outputs have nearly the same OSNR with optical power levels that satisfy the dynamic range requirements of the receivers. In other words, the input signal levels are adjusted to achieve relatively balanced OSNR levels across the WDM channels at the far end receivers. The process is also referred to as "pre-emphasis", because the power levels are "pre-emphasized" at the transmitters to anticipate the variations in additive noise and gain across the spectrum as the signals pass through the optical amplifiers to the far end receivers.

One way of performing channel balancing is to use an optical spectrum analyzer (OSA) to directly measure the OSNR of each of the optical channels. However, OSA equipment is relatively expensive. In addition, the purpose of channel balancing is not necessarily to achieve balanced OSNR, but to provide optimal and consistent margin against bit errors across all of the constituent WDM channels. However, a channel balancing exercise based on Bit Error Ratio (BER) requires a significant amount of time that increases linearly with channel count since existing automatic pre-emphasis techniques measure the operating limits of each channel by modifying the operating point of one channel at a time to minimize the change in over all loading of the system during the balancing process. Therefore, what is needed is a cost-effective channel balancing mechanism with minimal time requirements.

SUMMARY OF THE INVENTION

Embodiments of the present invention provide a method and apparatus for performing channel balancing on channels between optical network elements within an optic-fiber communications system. After grouping at least a portion of the channels into channel pairs, the transmitter output power level of each of the channel pairs is differentially adjusted from respective initial power levels to respective final power levels that are reached when the bit error ratio (BER) of at least one channel in each of the channel pairs exceeds a threshold. A respective first power margin for each of the channels is recorded as the difference between the respective initial power level and the respective final power level, and from the recorded power margins, a mean power margin is determined. The transmitter output power level of each of the channels is then shifted from the respective initial power levels by an amount proportional to the difference between the mean power margin and the respective recorded power margin.

In a further embodiment, after recording the first power margins, each of the channels is reset to the respective initial power levels, and the direction of power adjustment between the channels is reversed in each of the channel pairs to produce second power margins. In yet a further embodiment, a first estimated operating point of each of the channels is determined as the transmitter output power level produced as a result of shifting the respective initial power levels, and the process is repeated to determine a second estimated operating point of each of the channels. The process continues to be repeated if the respective operating difference between the respective first estimated operating point and the respective second estimated operating point for any of the channels is above an operating threshold or a number of iterations of the process is less than a predetermined number of iterations. In the first iteration, the channels are paired such that the remaining channel with the highest received power relative to a maximum power allowed for the channel is paired with the remaining channel having the lowest received power relative to a minimum power allowed for the channel. In each iteration thereafter, an operating margin for each of the channels is determined as a difference between the final power levels associated with the first and second power margins and the channels are paired such that the remaining channel with the highest margin to increased transmit power is paired with the remaining channel having the highest margin to decreased channel power.

In still a further embodiment, the transmitter output power levels of the respective channels are adjusted by adjusting a setting of a respective attenuator setting of the associated transmitter for each of the channels. For example, within each channel pair, the transmitter output power levels are adjusted such that the transmitter output power level of one the channels in the channel pair increases while the transmitter output power level of the other one of the channels in the channel pair decreases. In addition, the BER on each of the channels is measured at respective receivers thereof.

In an exemplary embodiment, the transmitter output power level of each of the channel pairs is differentially adjusted by determining an increment/decrement step size for each of the channel pairs and sequentially adjusting the transmitter output power level of each of the channel pairs using an alternating increment/decrement pattern that increments one of the channels of each channel pair by the respective increment/decrement step size for the respective channel pair and decrements the other channel of each channel pair by the respective increment/decrement step size for the respective channel pair until the BER of at least one channel in each of the channel pairs exceeds the threshold.

For example, a first bit error ratio (BER) threshold and a second BER threshold can be defined such that the second BER threshold has a higher BER associated therewith. A first increment/decrement step size can be used for low BER channel pairs in which each of the channels in the channel pair has a BER below the first BER threshold and a second increment/decrement step size can be used for high BER channel pairs in which at least one of the channels in the channel pair has a BER above the first BER threshold, in which the first increment/decrement step size is larger than the second increment/decrement step size.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

A channel balancing algorithm is described below that eliminates the OSA by using pre-forward error correction (pre-FEC) bit error ratio (BER) measurements at the far-end receivers, instead of OSNR measurements, to optimize the transmitted signal levels at the near-end transmitters. Depending on the application, some of the WDM channels may have relatively few or even zero errors prior to the FEC decoders. Unfortunately, this condition provides almost no information about the adjustments needed to improve BER performance of the remaining channels.

Therefore, the channel balancing algorithm avoids this limitation by temporarily worsening the channels with the fewest or zero pre-FEC errors while measuring the amount of power adjustment at the transmitters needed to reach the BER thresholds for most or all of the channels. The algorithm uses these measurements to estimate an optimal transmitter power setting that lies roughly between the operating extremes defined by the BER thresholds. After obtaining and implementing a first estimate, the algorithm again measures the operating limits of the channels and recursively estimates and implements new operating points, repeating this process until the difference between successive measurements and estimates converges to an acceptably small value.

Figure 1:
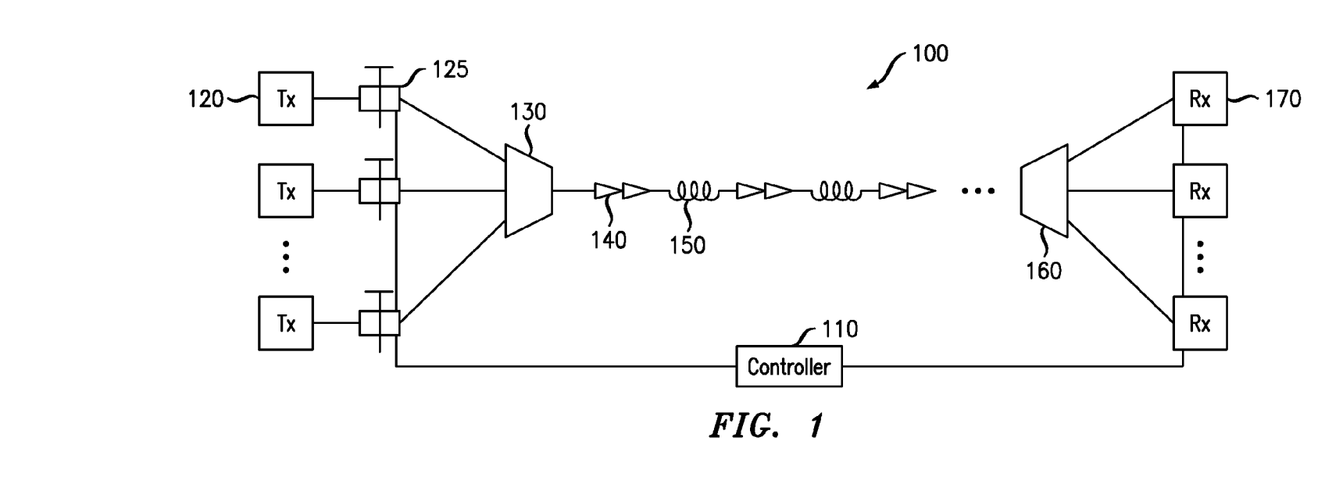
FIG. 1 is a block diagram illustrating an exemplary fiber-optic communication system for performing channel balancing in accordance with embodiments of the present invention.

Referring now to FIG. 1, there is illustrated an exemplary fiber-optic communication system 100 configured to perform the channel balancing algorithm of the present invention. The fiber-optic communication system 100 includes a plurality of optical transmitters 120 and a plurality of optical receivers 170. Each optical transmitter 120 is operable to transmit a respective optical signal to a respective one of the optical receivers 170.

The optical signals from all of the optical transmitters 120 are fed into an optical multiplexer 130 that combines and multiplexes the optical signals from each of the optical transmitters 120 onto a single optical fiber that includes one or more fiber spans 150 and one or more optical amplifiers 140. Each fiber span 150 may be on the order of 40-60 km in length for long-haul networks or may be any other suitable length for use in transmitting optical signals in the optic-fiber communications system 100. Each optical amplifier 140 may be, for example, a rare-earth-doped fiber amplifier (REDFA), such as erbium-doped fiber amplifiers (EDFAs), or other type of amplifier for amplifying the optical signal.

In addition, each optical amplifier 140 may be operated in either constant-gain mode or constant-power mode. For example, as shown in FIG. 1, each optical amplifier 140 is a two-stage amplifier operated in constant-power mode, such that the output power of each optical amplifier 140 is at a constant level. Each two-stage amplifier 140 includes a variable attenuator (not shown) for adjusting the gain of the optical amplifier within a fixed range to flatten out the gain of the optical amplifier across the spectrum.

The multiplexed optical signal is received at an optical demultiplexer 160 that demultiplexes the optical signals and provides the demultiplexed optical signals to the appropriate optical receivers 170. The optical path taken by each optical signal from optical transmitter 120 to optical receiver 170 is referred to herein as the optical channel. Each optical channel is carried on a different optical carrier wavelength and is modulated at a particular data rate. For example, the carrier wavelengths used may be within the C-band (1530 nm to 1565 nm) as well as the L-band (1565 nm to 1635 nm), and the channels may be modulated at data rates from 2.5 Gbps (OC-48) to 40 Gbps (OC-768). However, the present invention is not limited to any particular wavelength, group of wavelengths or data rate. In general, the carrier wavelength of any particular channel may be in the range of 1240 nm-1670 nm.

In addition, the number of channels provided by the optic-fiber communications system 100 is not limited to any particular number of channels. For example, the optic-fiber communications system 100 may include only two channels or hundreds of channels, depending on the capacity requirements of the system 100. Furthermore, the number of optical amplifiers 140 used is not limited to any particular number of optical amplifiers 140.

However, as the number of optical amplifiers 140 increases, the cumulative effect of the variations in gain and amplified spontaneous emission (ASE) noise applied to each of the optical channels by the optical amplifiers 140 increases. As a result, the output spectrum at the optical receivers 170 may vary widely in optical signal-to-noise ratio (OSNR) and power levels between the optical channels. Therefore, channel balancing may be performed to adjust the relative input power levels (transmitter output power levels) of the channels until all of the associated receiver outputs have nearly the same OSNR with optical power levels that satisfy the dynamic range requirements of the receivers 170.

However, depending on the type of traffic carried on each channel, one or more of the channels may have a different noise threshold. As used herein, the term "noise threshold" refers to the minimum input power (transmitter output power)

at which the channel noise produces post-forward error correcting (FEC) errors. For example, a 2.5 Gbps channel will have a noise threshold at a channel power approximately 6 dB lower than that of a 10 Gbps channel. Therefore, setting the input power levels so that all channels have nearly the same OSNR at the output may result in some channels having larger noise margins (e.g., difference in input power between the minimum noise and the noise threshold) than other channels, resulting in varying BER performance across the channels.

Figure 2:
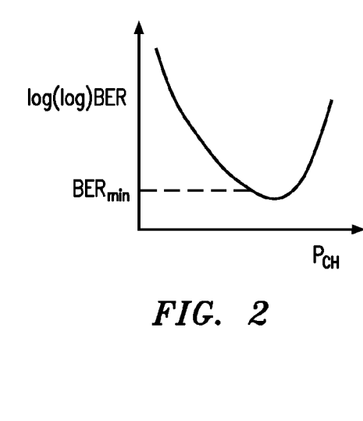
FIG. 2 is a graph illustrating the relationship between the channel output power level and the channel bit error ratio (BER)

Therefore, in accordance with embodiments of the present invention, a channel balancing algorithm based on BER is used to optimize the BER on each of the channels. For example, referring now to FIG. 2, at low channel powers the BER of a channel is inversely proportional to the channel input power (transmitter output power) until the BER reaches a minimum BER ($BER_{min}$) for the channel. The BER typically remains at $BER_{min}$ over a range of input powers. However, as the channel input power increases past the $BER_{min}$ range, the BER again increases as the channel approaches a nonlinear threshold. The channel balancing algorithm operates to adjust the input channel power of each channel so that the BER of that channel is within the $BER_{min}$ range.

Referring again to FIG. 1, the channel balancing algorithm is implemented using a controller 110 coupled between the transmitters 120 and receivers 170 of the optic-fiber communications system 100. The controller 110 includes any device, system or part thereof that controls execution of the channel balancing algorithm and adjustment of the input power levels of the channels. The controller 110 can be implemented in hardware, software, firmware, or some combination thereof. It should be noted that the functionality associated with the controller 110 may be centralized or distributed, whether locally or remotely.

The controller 110 operates to adjust the transmitter output power levels of each of the transmitters 120 to achieve the optimal BER for each channel by adjusting respective attenuators 125 associated with the transmitters 120. More specifically, the controller 110 is configured to take pre-forward error correction (pre-FEC) bit error ratio (BER) measurements at each receiver 170 while adjusting the attenuator settings of each transmitter 120 to increase and decrease the input power of each channel in order to determine the operating power margins (noise margin and nonlinear margin) of each channel. From the power margins of all of the channels, the controller 110 estimates optimal transmitter power settings for each transmitter 120 that lie roughly between the operating thresholds (noise threshold and nonlinear threshold).

Figure 3:
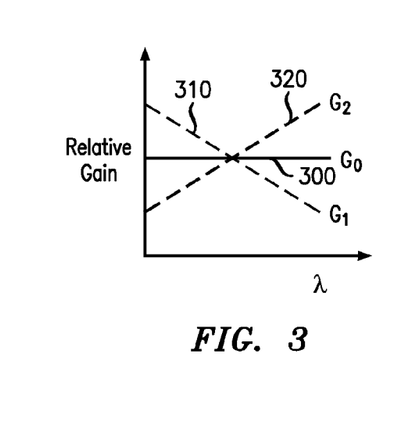
FIG. 3 is a graph illustrating the relationship between the channel wavelength and the amplifier gain.

To minimize the time required to perform the BER-based channel balancing algorithm, the controller 110 operates to adjust the settings of all of the channels at the same time. However, since the gain of the first amplifier 140 in the optical path is responsive to the total input load from the multiplexer 130, arbitrarily increasing or decreasing the power on the channels may change the total input power, and therefore, the total input load to the first amplifier 140, which can put a tilt on the spectral response of the first amplifier 140. For example, referring now to FIG. 3, the amplifier gain is flat (constant) over the spectral range of the amplifier for only a particular gain ($G_0$), as shown by solid line 300. If the gain is increased to, for example, $G_1$ a spectral tilt results that is inversely proportional to the optical wavelength, as shown by dotted line 310. Likewise, if the gain is decreased to, for example, $G_2$, a spectral tilt results that is proportional to the optical wavelength, as shown by dotted line 320.

Therefore, referring again to FIG. 1, in order to maintain constant total input power to the first amplifier 140, for each channel whose input power is increased, another channel's input power is decreased by the same amount. More particularly, the algorithm measures the power margins of the channels in parallel, by first grouping the channels into ordered pairs and differentially adjusting the transmitter output power of each channel while measuring the power margins across the spectrum. In this approach, one member of all pairs is adjusted upward while the opposite member of all pairs is simultaneously adjusted downward. This maintains constant aggregate power for the entire spectrum even though all of the channels are being adjusted at once.

In an exemplary operation, the controller 110 records the initial transmitter output power level (transmitter attenuator value) of each channel and groups the channels into ordered pairs. The controller 110 differentially adjusts the transmitter output power of each channel pair by adjusting the settings of their respective attenuators 125 until the pre-FEC BER of at least one channel in each channel pair exceeds a BER threshold, an attenuator adjustment limit is reached or a dynamic range limit of the receiver 170 is exceeded. When a channel reaches one or more of these limits, the controller 110 records the attenuator setting (and hence, the power margin) associated with this channel as well as the setting associated with its partner, returns this channel as well as its partner to their initial attenuator settings and repeats the process reversing the respective adjustment directions of the channels.

After completion of the reverse process for each channel pair, the controller 110 has a set of maximum and minimum transmitter attenuator settings for each channel corresponding to the actual or realized "noise" and "nonlinear" thresholds. The controller 110 operates next to calculate the average (mean) over all of the recorded "noise margins". The controller 110 then operates to adjust the attenuator values of all of the transmitter attenuators 125 to the respective estimated operating points by moving them from their respective initial power levels by an amount proportional to the difference between the mean noise power margin and their respective recorded power margins, provided that this does not result in an unacceptable "nonlinear" margin. After obtaining and implementing a first estimate, the controller 110 again measures the power margins of the channels and recursively estimates and implements new operating points, repeating this process until the difference between successive measurements and estimates converges to an acceptably small value.

Figure 4:
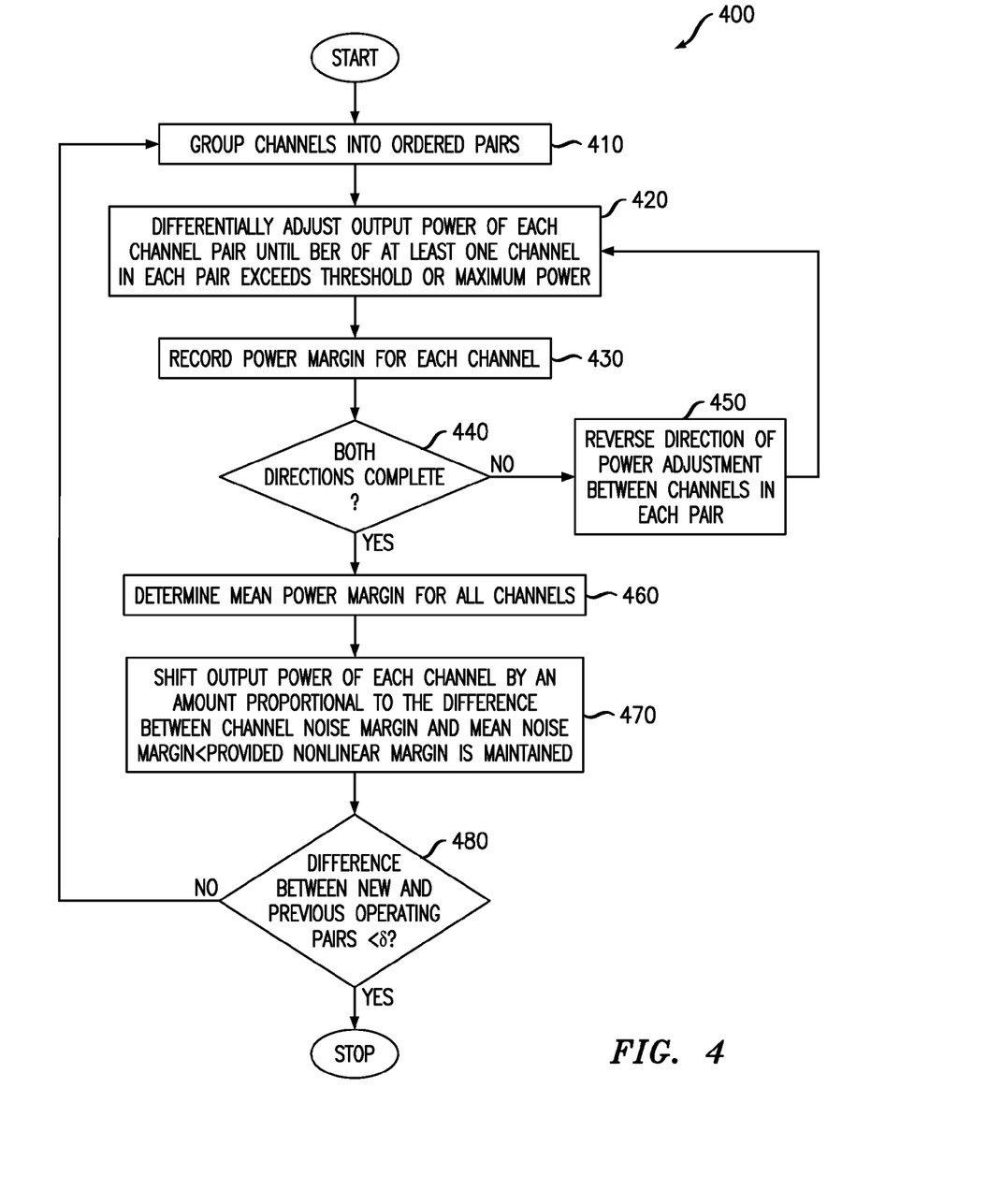
FIG. 4 is a flowchart illustrating an exemplary process for performing channel balancing, in accordance with embodiments of the present invention.

Turning now to FIG. 4, an exemplary high-level process 400 for performing the channel balancing algorithm of the present invention is illustrated. Initially, at step 410, at least a portion of the channels between two optical network elements of an optic-fiber communications system are grouped into ordered pairs. At step 420, the transmitter output power of each channel pair is differentially adjusted until the pre-FEC BER of at least one channel in each channel pair exceeds a BER threshold, an adjustment limit is reached or a maximum power for the channel is exceeded. When a channel reaches one or more of these limits, at step 430, the power margin associated with this channel as well as the power margin associated with its partner is recorded.

At step 440, a decision is made whether the power margin has been recorded for both adjustment directions for each channel. If not, at step 450, the respective adjustment directions of the channels are reversed, and at steps 420 and 430, the transmitter output power of each channel pair is differentially adjusted again in the reverse to record a second power margin for each of the channels. If so, the process continues to step 460, where a mean power margin is determined from all of the recorded power margins (in both directions).

Thereafter, at step 470, the transmitter output power of each channel is shifted by an amount proportional to the difference between the mean "noise" margin and the recorded channel "noise" margin for that channel in order to set each channel to a new estimated operating point (transmitter output power level) while maintaining an adequate "nonlinear" margin. At step 480, a decision is made whether the respective differences between new estimated operating points and previously calculated estimated operating points for each of the channels is less than a predetermined amount, denoted δ. If the difference between the new operating points and previous operating points for all of the channels is less than δ, the process ends. If not, the process is repeated at step 410.

Figure 5A:
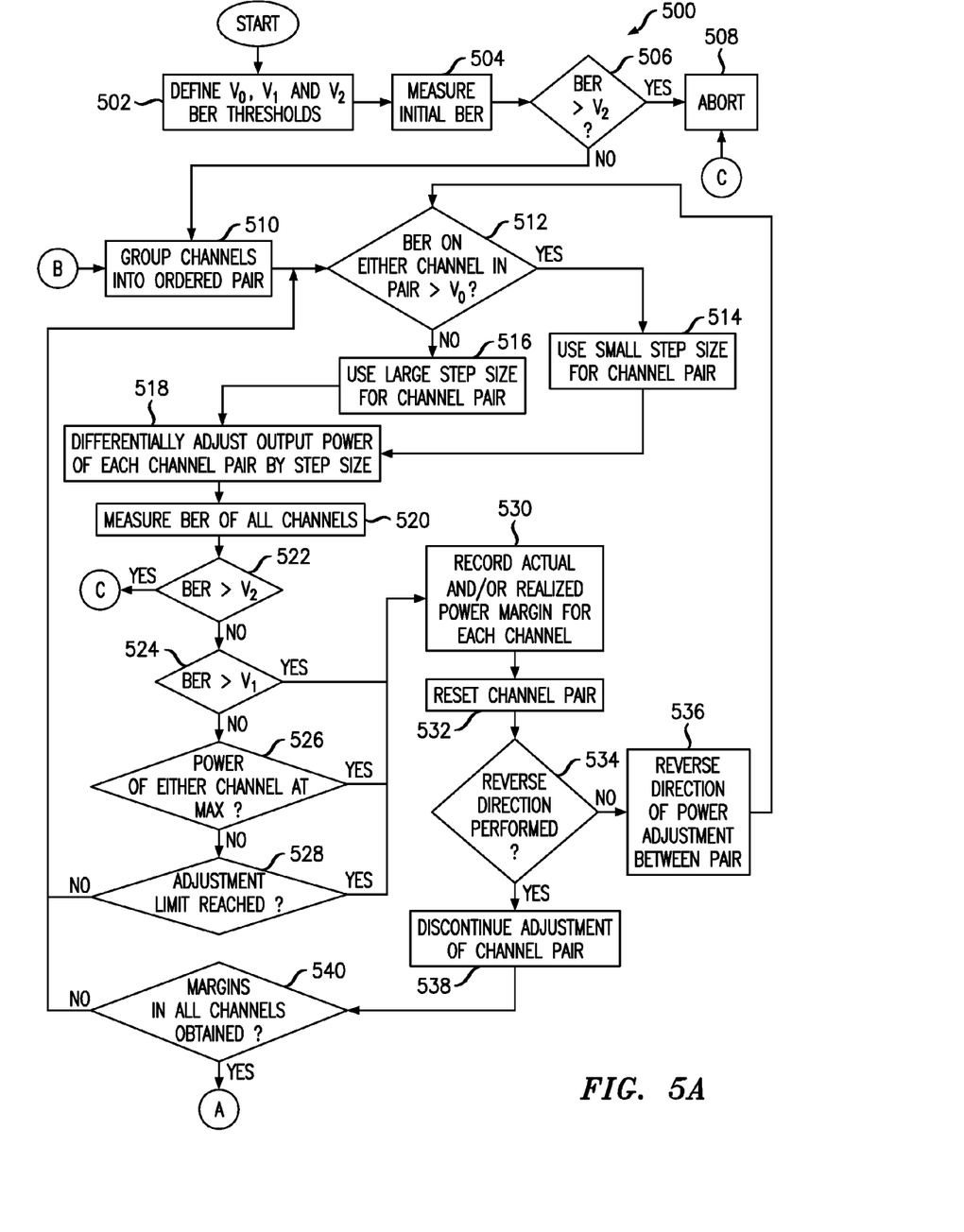
FIGS. 5A and 5B are flowcharts illustrating a more detailed exemplary process for performing channel balancing, in accordance with embodiments of the present invention.
Figure 5B:
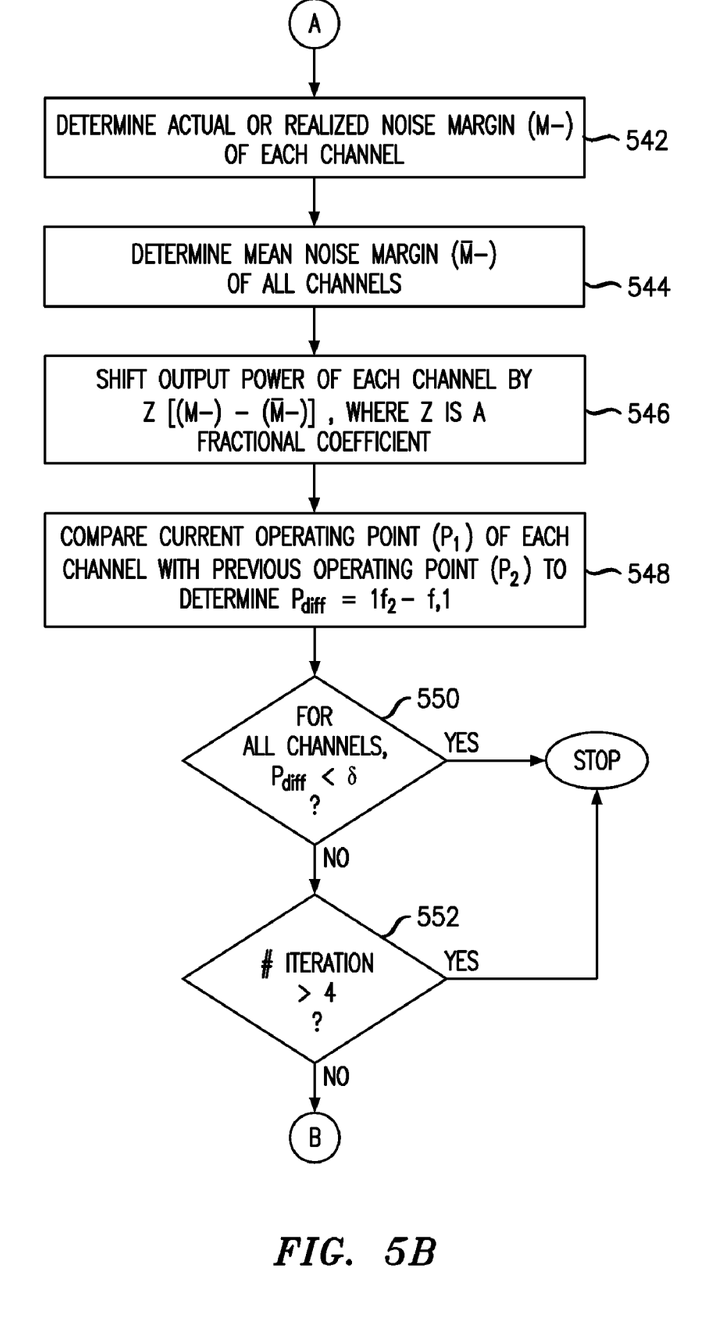
Figure 6:
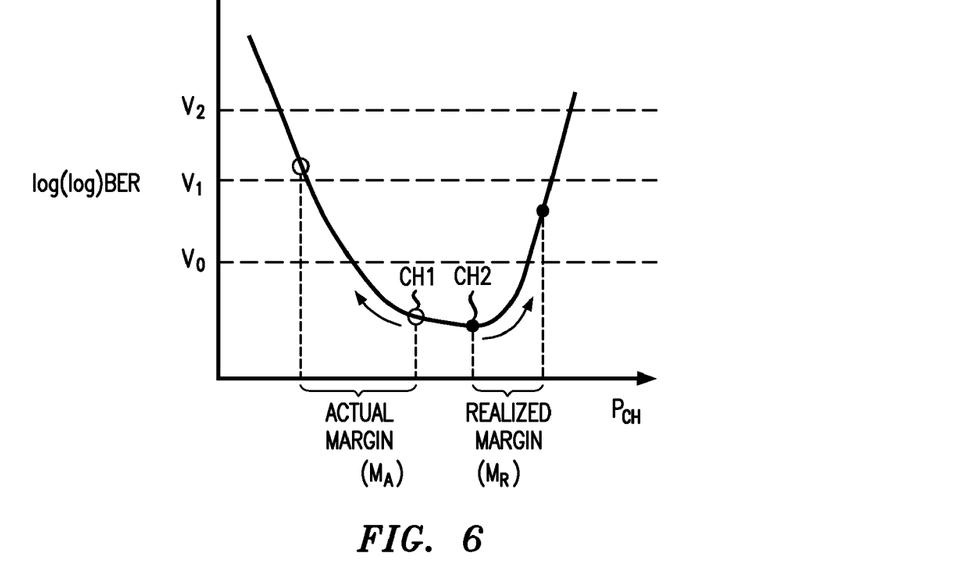
FIG. 6 is a graph illustrating the actual and realized power margins measured during the process of channel balancing, in accordance with embodiments of the present invention.

FIGS. 5A and 5B illustrate a more detailed process 500 for performing the channel balancing algorithm of the present invention. Initially, at step 502, three BER thresholds are defined to be used throughout the channel balancing process. Although the definition of these thresholds may be the same regardless of the particular channel, the actual value will depend upon the transceiver type and data rate. For example, as shown in FIG. 6, a first BER threshold, denoted V2, can equal the highest pre-FEC error threshold which, if exceeded, halts execution of the algorithm. This threshold should be placed slightly below the error-correction threshold for the FEC type associated with each channel and ensures that the algorithm never adjusts a system to the point that post FEC errors are produced. Under normally anticipated conditions, the BER on any given channel will never exceed its associated V2 threshold.

A second BER threshold, denoted V1, can equal the next lower threshold which, if exceeded, identifies the maximum or minimum attenuator setting (transmitter output power level) needed during the optimization process. In general, the algorithm will decrement half of the channels to obtain the minimum settings which cause this threshold to be crossed. Simultaneously, the algorithm will also increment the remaining half of the channels to obtain the maximum settings which also cause this threshold to be crossed. After obtaining all available threshold crossings, the algorithm uses the associated attenuator values to estimate the intermediate settings needed for an optimized configuration.

Finally, a third BER threshold, denoted V0, can equal the lowest threshold, which controls the step size used for the increment/decrement steps as the attenuators are adjusted up and down. In an exemplary embodiment, channel pairs in which the BER of both partners is below the V0 threshold will be incremented and decremented in 0.4 dB steps, while channel pairs in which the BER of either partner is above the V0 threshold will be incremented and decremented in 0.2 dB steps. The difference in step size ensures rapid measurements on channels having relatively low BER, while also ensuring that the V2 threshold is never crossed on channels experiencing a relatively high BER.

Returning to FIG. 5A, once all of the BER thresholds are defined, at step 504, an initial BER measurement is taken on all of the channels and the initial transmitter output power levels (attenuator settings) of all channels are recorded. If, at step 506, the V2 threshold is crossed on any channel, at step 508, the algorithm is aborted. If all channels are below the V2 threshold, the process continues at step 510, where the channels are grouped into ordered pairs. For example, in an exemplary embodiment, the channels can be rank ordered, according to the optical channel power level at the receiver from highest power (relative to the rated maximum for each receiver) to lowest power (relative to the rated minimum for each receiver). The channel having the highest received power (relative to the maximum allowed) can be paired with the channel having the lowest received power (relative to the minimum allowed) and the channel having the second to the highest received power can be paired with the channel having the second to the lowest received power, continuing until all of the channels have been associated into pairs. For networks with an odd number of channels, the final "odd-channel-out" can be adjusted without a partner.

After all of the channels have been grouped, at step 512, for each channel pair, a determination is made whether the BER on either channel in that pair is greater than V0. If so, at step 514, the small step size (e.g., 0.2 dB) is used for both channels in that pair. If not, at step 516, the large step size (e.g., 0.4 dB) is used for both channels in that pair. The process then continues at step 518, where the transmitter output power levels of all members of all pairs are differentially adjusted using an alternating increment/decrement pattern. This pattern begins by incrementing one member of the first pair and then decrementing the other member of the same pair. The process continues in the same way to the second, third and all subsequent pairs until all channels have been adjusted. For networks with an odd number of channels, the last odd-channel-out will be incremented if the last member of the last pair was decremented. Conversely, the last odd-channel-out will be decremented if the last member of the last pair was incremented.

After completing all of the differential adjustments, at step 520, a 30 second BER measurement is obtained on all of the channels. At step 522, a determination is made whether the V2 threshold has been crossed on any channel. If so, the process proceeds to step 508, and the algorithm is aborted. If not, at steps 524, 526 and 528, determinations are made whether the V1 threshold has been crossed, the maximum receiver power has been reached or an attenuator adjustment limit has been reached on any channel. For all channel pairs for which neither of the channels in those pairs has reached any of the limits of steps 524, 526 and 528, the process continues at step 512, where the step size is again determined based on the latest BER measurement taken at step 520 and the channels in each pair are differentially incremented/decremented until a V1 threshold is crossed, an attenuator adjustment limit is reached or a dynamic range limit is exceeded.

If one or more channels reach one or more of these limits, the process continues to step 530, where the actual and/or realized power margin of those channels and their partners are recorded. For example, referring again to FIG. 6, channel 1 (CH1) and channel 2 (CH2) are paired. The initial transmitter output power level of CH1 is shown as an open circle below the V0 threshold, while the initial transmitter output power level of CH2 is shown as a dot below the V0 threshold. As CH1 and CH2 are differentially adjusted (i.e., the power of CH1 is adjusted downward and the power of CH2 is adjusted upward), the BER of CH1 eventually crosses the V1 threshold. At that time, the actual power margin ($M_A$) is recorded for CH1 as the difference between the initial power level of CH1 and the final power level of CH1 when it crossed the V1 threshold. In addition, the realized power margin ($M_R$) is recorded for CH2 as the difference between the initial power level of CH2 and the final power level of CH2 when CH1 crossed the V1 threshold. In FIG. 6, $M_A$ is shown as a "noise" margin, while $M_R$ is shown as a "nonlinear" margin. In practice $M_A$ and $M_R$ may be either "noise" or "nonlinear" margins.

Returning again to FIG. 5A, after the power margins for the pair(s) that have crossed the V1 threshold, reached the adjustment limit or reached their dynamic limit are recorded, at step 532, the channels in each of these pairs are returned to their initial transmitter output power levels. Thereafter, at step 534, a determination is made whether the reverse direction has been performed for those channel pairs. For all pairs for which the reverse direction has not yet been performed, at step 536, the increment/decrement direction for those pairs is reversed, and the process is repeated at step 512, where the step size is determined for differentially adjusting the channel pairs in the reverse. If any of the channel pairs have already been reversed once, at step 538, those channel pairs remain at their respective initial power levels and no further adjustment is performed on either of the channels in those channel pairs.

Thereafter, at step 540, a determination is made whether the power margins for all channels in both directions have been obtained. If not, the process repeats at step 512, where the step size is again determined for the remaining channels which have not reached their limits in both directions. Once the power margins in both directions (forward and reverse) have been recorded for all channels, the process continues in FIG. 5B at steps 542 and 544, where actual or realized "noise" power margin (M−) for each channel and the mean "noise" power margin ($\overline{M}$−) over all channels are determined. The process continues at step 546, where the transmitter output power of each channel is shifted by an amount equal to:

$$S = Z[(M-) - (\overline{M}-)],$$

where Z is a fractional coefficient. In an exemplary embodiment, Z=0.5. However, other values of Z may be used depending upon the implementation. Thus, for each channel, the shift amount S is added to the initial transmitter output power level recorded at the beginning of the iteration to produce an estimated operating point (estimated transmitter output power level), and the transmitter output power level for that channel is adjusted to this estimated operating point.

The process then continues to step 548, where the current operating point ($P_1$) of each channel is compared with its previous operating point ($P_2$) to determine the difference between them, i.e., ($|P_2 - P_1|$). If, at step 550, the maximum difference across the channels is less than delta, e.g., delta=0.2 dB, or the total number of iterations of the algorithm is greater than or equal to a maximum number of iterations, e.g., n>4, the algorithm is halted and the optimization is complete. Otherwise, the next iteration of the algorithm is begun at step 510 and the differences between the estimated operating points are compared again.

Figure 7:
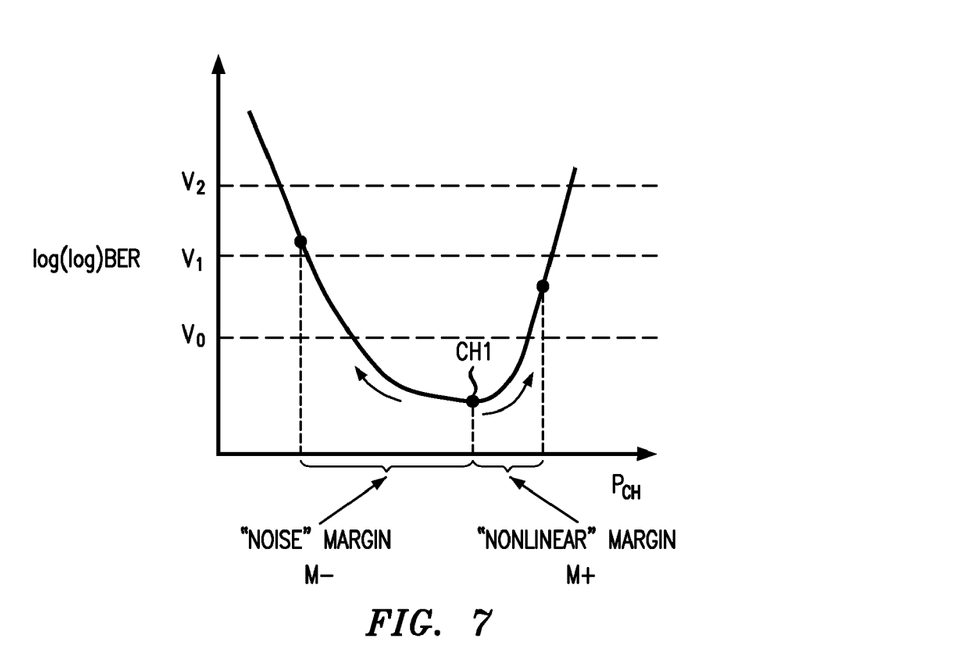
FIG. 7 is a graph illustrating an exemplary individual channel "noise" margin (M−) and "nonlinear" margin (M+).

However, in the second and all subsequent iterations of the algorithm, instead of grouping the channels into pairs based on the received power, the channels are grouped into pairs based on their observed "noise" margin (M−) and observed "nonlinear" margin (M+), as shown in FIG. 7. The channels can then be rank-ordered according to their estimated operating margins, and the channel can be paired such that the channel having the greatest estimated "noise" margin (M−) is paired with the channel having the greatest estimated "nonlinear" margin (M+). Then, the channel having the second to the highest M− is paired with the channel having the second to the highest M+, continuing until all of the channels have been associated into pairs. As before, the final "odd-channel-out" can be adjusted without a partner in systems having an odd number of channels.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A method for performing channel balancing on channels between optical network elements within an optic-fiber communications system, said method comprising:
   grouping at least a portion of the channels into channel pairs;
   differentially adjusting a transmitter output power level of each of the channel pairs from respective initial power levels to respective final power levels that are reached when a bit error ratio (BER) of at least one channel in each of the channel pairs exceeds a threshold;
   recording a respective first power margin for each of the channels as the difference between the respective initial power level and the respective final power level;
   determining a mean power margin from the recorded first power margins of each of the channels; and
   shifting the transmitter output power level of each of the channels from the respective initial power levels by an amount proportional to the difference between the mean power margin and the respective recorded first power margin.

2. The method of claim 1, wherein the power margins are first power margins and further comprising:
   resetting each of the channels to the respective initial power levels;
   reversing the direction of power adjustment between the channels in each of the channel pairs;
   repeating the steps of differentially adjusting the transmitter output power level of each of the channel pairs, recording the power margins for the reverse direction to produce second power margins and determining the mean power margin from one of the first and second power margins from each of the channels that corresponds to a noise power margin.

3. The method of claim 2, further comprising:
   determining a nonlinear power margin for each of the channels from the recorded first and second power margins of the respective channels; and
   using the nonlinear power margin during the step of shifting to ensure that a nonlinear threshold margin exceeds a predetermined level.

4. The method of claim 2, wherein the step of shifting further includes:
   shifting the output power level of each of the channels by an amount equal to the product of a fractional coefficient and the difference between the mean power margin and the respective noise power margin.

5. The method of claim 4, wherein the fractional coefficient is equal to 0.5.

6. The method of claim 2, further comprising:
   determining a first estimated operating point as the transmitter output power level produced after the step of shifting;
   repeating the method to determine a second operating point of each of the channels;
   determining a respective operating difference for each of the channels between the respective first estimated operating point and the respective second estimated operating point; and
   repeating the method if any of the operating differences is above an operating threshold or a number of iterations of the method is less than a predetermined number of iterations.

7. The method of claim 6, wherein the steps of repeating the method further include:

determining a noise margin for each of the channels as a difference between one of the final power levels and one of the first and second power margins;

determining a nonlinear margin for each of the channels as a difference between the other of the final power levels and the other of the first and second power margins;

pairing one of the channels having the highest one of the noise margins with one of the channels having the highest one of the nonlinear margins;

repeating the step of pairing such that one of the channels having the next highest one of the noise margins is paired with one of the channels having the next highest one of the nonlinear margins until substantially all of the channels are paired into new channel pairs; and repeating the method using the new channel pairs.

8. The method of claim 6, wherein the operating threshold is 0.2 dB.

9. The method of claim 6, wherein the predetermined number of iterations is 4.

10. The method of claim 2, wherein the steps of differentially adjusting further include:

adjusting a respective attenuator setting of the associated transmitter for each of the channels such that the transmitter output power level of one the channels in each of the channel pairs increases while the transmitter output power level of the other one of the channels in each of the channel pairs decreases;

measuring the BER on each of the channels at respective receivers thereof; and determining when the BER on one the channels in each of the channel pairs exceeds a threshold.

11. The method of claim 2, wherein the steps of differentially adjusting the output power of each of the channel pairs further include:

determining an increment/decrement step size for each of the channel pairs; and sequentially adjusting the transmitter output power level of each of the channel pairs using an alternating increment/decrement pattern that increments one of the channels of each channel pair by the respective increment/decrement step size for the respective channel pair and decrements the other channel of each channel pair by the respective increment/decrement step size for the respective channel pair until the BER of at least one channel in each of the channel pairs exceeds the threshold.

12. The method of claim 11, wherein the step of determining the increment/decrement step size further includes:

defining a first bit error ratio (BER) threshold and a second BER threshold, the second BER threshold having a higher BER associated therewith;

using a first increment/decrement step size for low BER channel pairs in which each of the channels in the channel pair has a BER below the first BER threshold; and using a second increment/decrement step size for high BER channel pairs in which at least one of the channels in the channel pair has a BER above the first BER threshold;

wherein the first increment/decrement step size is larger than the second increment/decrement step size.

13. The method of claim 12, wherein the step of sequentially adjusting the output power level of each of the channel pairs further includes:

sequentially adjusting the transmitter output power level of each of the channels within the low BER channel pairs by the first increment/decrement step size until the BER of one of the channels within each of the low BER channel pairs exceeds the first threshold;

after exceeding the first threshold, sequentially adjusting the transmitter output power level of each of the channels within the low BER channel pairs by the second increment/decrement step size until the BER of one of the channels within each of the low BER channel pairs exceeds the second threshold; and sequentially adjusting the transmitter output power level of each of the channels within the high BER channel pairs by the second increment/decrement step size until the BER of one of the channels within each of the high BER channel pairs exceeds the second threshold; and wherein the step of recording further includes:

recording the first or second power margin of the channels within a respective one of the channel pairs when the BER of one of the channels in the respective channel pairs exceeds the second threshold.

14. The method of claim 12, wherein the first increment/decrement step size is 0.4 dB and the second increment/decrement step size is 0.2 dB.

15. The method of claim 12, further comprising:

defining a third BER threshold having a BER associated therewith that is higher than the BER associated with the second BER threshold; and aborting said method when the BER of any of the channels is above the third BER threshold.

16. The method of claim 15, wherein the third BER threshold is set at a BER that is slightly below a pre-forward error correction error threshold defining the highest pre-forward error correction BER at which the method can be executed, the second BER threshold is set at a BER that defines a maximum or minimum transmitter attenuator setting to be used during the method and the third BER threshold is set at a BER that ensures rapid measurements on channels experiencing a low BER and that ensures that the third BER threshold is not crossed on channels experiencing a high BER.

17. The method of claim 2, wherein the steps of differentially adjusting, recording, resetting, reversing and repeating are performed separately for each of the channel pairs.

18. The method of claim 2, wherein the step of differentially adjusting further includes:

differentially adjusting a transmitter output power level of each of the channel pairs from respective initial power levels to respective final power levels that are reached when a bit error ratio (BER) of at least one channel in each of the channel pairs exceeds a threshold or a respective maximum power for each of the channels is exceeded.

19. The method of claim 2, wherein the step of differentially adjusting further includes:

differentially adjusting a transmitter output power level of each of the channel pairs from respective initial power levels to respective final power levels that are reached when a bit error ratio (BER) of at least one channel in each of the channel pairs exceeds a threshold or a respective attenuator adjustment limit on the associated transmitter is exceeded.

20. The method of claim 2, wherein the step of grouping the channels into channel pairs further includes:

pairing one of the channels having the highest received power relative to a maximum power allowed for the channel with one of the channels having the lowest received power relative to a minimum power allowed for the channel; and repeating the step of pairing such that one of the channels having the next highest received power is paired with one of the channels having the next lowest received power until substantially all of the channels are paired.

21. An apparatus for performing channel balancing on channels between optical network elements within an optic-fiber communications system, said apparatus comprising:

means for grouping at least a portion of the channels into channel pairs;

means for differentially adjusting a transmitter output power level of each of the channel pairs from respective initial power levels to respective final power levels that are reached when a bit error ratio (BER) of at least one channel in each of the channel pairs exceeds a threshold;

means for recording a respective power margin for each of the channels as the difference between the respective initial power level and the respective final power level;

means for determining a mean power margin from the recorded power margins of each of the channels; and means for shifting the transmitter output power level of each of the channels from the respective initial powers by an amount proportional to the difference between the mean power margin and the respective recorded power margin.

* * * * *